(No Model.)
C. A. RIEDER & D. FORD.
TWO WHEELED VEHICLE.
No. 431,710. Patented July 8, 1890.
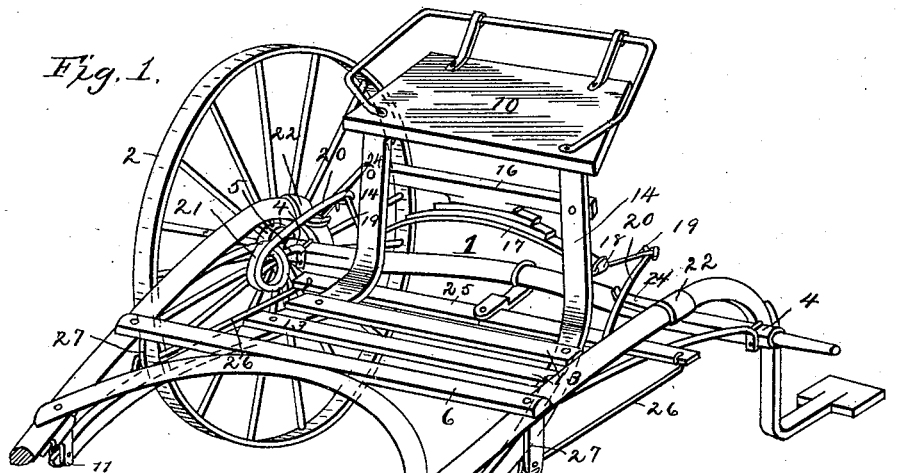
Fig. 1.
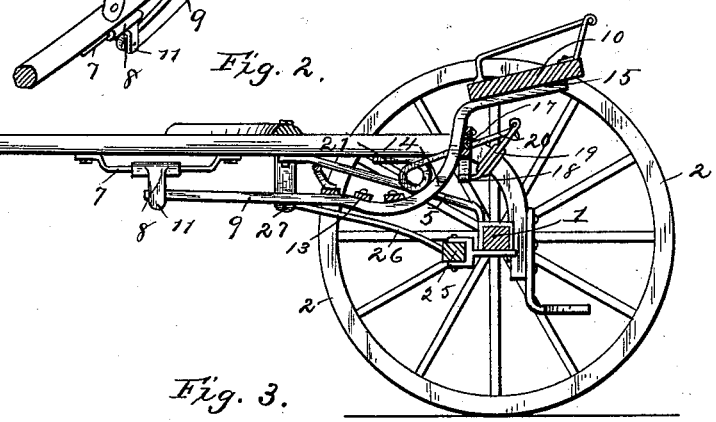
Fig. 2.
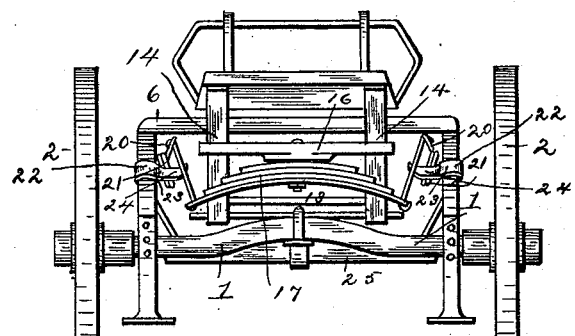
Fig. 3.
Witnesses
H. L. Amer.
N. P. Riley
By their Attorneys,
Inventors
Cyrus A. Rieder
and David Ford.

UNITED STATES PATENT OFFICE.

CYRUS A. RIEDER AND DAVID FORD, OF ANTHONY, KANSAS.

TWO-WHEELED VEHICLE.

SPECIFICATION forming part of Letters Patent No. 431,710, dated July 8, 1890.

Application filed February 4, 1890. Serial No. 339,135. (No model.)

*To all whom it may concern:*

Be it known that we, CYRUS A. RIEDER and DAVID FORD, citizens of the United States, residing at Anthony, in the county of Harper and State of Kansas, have invented a new and useful Two-Wheeled Vehicle, of which the following is a specification.

The invention relates to improvements in two-wheeled vehicles.

The object of the present invention is to produce a two-wheeled vehicle of simple and economic construction, in which the motion of a horse will be entirely independent of and not be communicated to the body of the vehicle.

The invention consists in the construction and novel combination and arrangement of parts hereinafter fully described, illustrated in the drawings, and pointed out in the claims hereto appended.

In the drawings, Figure 1 is a perspective view of a vehicle embodying the invention. Fig. 2 is a central longitudinal sectional view. Fig. 3 is a rear elevation.

Referring to the accompanying drawings, 1 designates an axle, which is provided at its end with wheels 2, and has clipped to it the rear curved end 3 of a pair of thills 4, that are braced by rods 5, each having one end secured to a thill beneath the cross-bar 6, and the other end secured to the axle by the bolts that fasten the curved ends of the thills. The thills are provided slightly in advance of the cross-bar 6 with guide-rods 7, which have their ends perforated and bolted or otherwise secured to the thill, and are adapted to receive sliding sleeves 8, that are connected to side bars 9 of the vehicle-bottom, whereby the latter and the seat 10, that is secured thereto, are rendered capable of limited longitudinal movement, thereby preventing the motion of the horse being communicated to the body of the vehicle. The sleeves 8 are provided with depending ears 11, between which are pivoted the ends of the side bars 9, and the latter are connected and secured together about midway their length by transverse slats 12, that form the bottom of the vehicle, and the foremost slat is provided with a guard or foot-brace 13. The side bars 9 are bent up vertically at 14, and they have their extreme ends 15 extending in an approximately horizontal plane and bolted to the under side of the seat 10. The vertical portions 14 of the side bars are connected together slightly below the seat by a spring-bar 16, that has secured to its lower face a semi-elliptic leaf-spring 17, whose ends are constructed in the usual manner with eyes, in which are arranged loops 18 of link-rods 19, that connect the semi-elliptic leaf-springs with the rearwardly-extending ends 20 of coiled main springs 21, whose other ends are secured to the lower faces of the thills. By this construction the seat and body of the vehicle are securely prevented being jarred, and in order to prevent a too great downward movement of the rearwardly-extending end 20 of the coiled main springs 21 the thills are provided with brackets 22, that are composed of a curved portion 23, which is secured to the upper face of the thill, and a laterally-extending arm 24, that is arranged beneath the said end 20.

A whiffletree 25 is centrally pivoted to the axle and arranged beneath the body of the vehicle, and it has its ends secured to rods 26, that extend forward and have their free end provided with trace-hooks and supported by straps 27, that are secured to the thills.

From the foregoing description and the accompanying drawings the construction, operation, and advantages of the invention will be readily understood, and it will be readily seen that when a heavy weight is brought to bear upon the body of the vehicle the ends 20 of the main springs will be supported by the brackets and the weight will be thrown upon the leaf-spring.

Having described our invention, what we claim is—

1. In a two-wheeled vehicle, the combination of the side bars having their front ends connected with the thills and their rear ends carrying a seat, the spring-bar secured to the cross-bars, the semi-elliptic spring centrally secured to the frame-bar, the coiled main springs secured to the thills and having rearwardly-extending ends loosely connected to the leaf-spring, and the brackets 29, arranged to support the rearwardly-extending ends of the coiled springs, substantially as and for the purpose described.

2. In a two-wheeled vehicle, the combination of the thills provided with guide-rods 7, the sliding sleeves arranged upon the guide-rods, the side bars 9, having their rear ends secured to a seat and their front ends connected to the sliding sleeves, the spring-bar 16, secured to the side bars and arranged a short distance below the seat, the semi-elliptic spring centrally secured to the spring-bar, the coiled spring 21, secured to the thills and having rearwardly-extending ends, and the links connecting the coiled springs with the leaf-spring, substantially as described.

3. The combination, with the thill, of the coiled main spring 21, secured to the thill and having a rearwardly-extending end 20, and the bracket 22, secured to the thill and having a laterally-extending arm arranged beneath the rearwardly-extending end of the spring to support the same, substantially as described.

In testimony that we claim the foregoing as our own we have hereto affixed our signatures in presence of two witnesses.

CYRUS A. RIEDER.
DAVID FORD.

Witnesses:
R. R. BEANE,
H. PARKE JONES.